United States Patent [19]
Waidelich

[11] 3,738,281
[45] June 12, 1973

[54] EMERGENCY SUPPORT AND DECELERATING MECHANISM FOR MAGNETICALLY SUPPORTED VEHICLE

[75] Inventor: Jack P. Waidelich, Bonita, Calif.

[73] Assignee: Rohr Industries, Inc., Chula Vista, Calif.

[22] Filed: May 6, 1971

[21] Appl. No.: 140,735

[52] U.S. Cl. ...... 104/23 FS, 104/134, 104/148 MS, 188/76, 188/62
[51] Int. Cl. ............................................. B60v 3/04
[58] Field of Search ........ 104/23 FS, 134, 148 MS, 104/148 LM; 188/176, 62

[56] References Cited
UNITED STATES PATENTS

| 425,408 | 4/1890 | Craw | 105/154 |
| 3,225,228 | 12/1965 | Roshala | 104/148 LM X |
| 3,233,559 | 2/1966 | Smith et al. | 104/23 FS X |
| 3,631,806 | 1/1972 | Barthalon | 104/148 MS |

Primary Examiner—Gerald M. Forlenza
Assistant Examiner—D. W. Keen
Attorney—George E. Pearson

[57] ABSTRACT

An emergency support and decelerating mechanism for a high speed, magnetically supported vehicle comprises one or more pairs of liquid-vapor bearing type shoes mounted one on each side of the vehicle, each shoe overlying, and spaced from, a support rail mounted one along each side of the path of the vehicle. In the event of loss of magnetic vehicle support, the vehicle drops by gravity to lower the shoes onto their respective rails, for sliding, vehicle supporting, movement therealong. As the shoes are thus lowered onto the rails, jets of vaporizable liquid are ejected at controlled rates through orifices provided in the soles of the shoes, which are thus lubricated and cooled.

6 Claims, 4 Drawing Figures

PATENTED JUN 12 1973 3,738,281

INVENTOR.
JACK P. WAIDELICH
BY
George R. Pearson
ATTORNEY

EMERGENCY SUPPORT AND DECELERATING MECHANISM FOR MAGNETICALLY SUPPORTED VEHICLE

BACKGROUND OF THE INVENTION

In a new generation of high speed mass transit vehicles now under development, an important concept is to support the vehicles magnetically, either by attraction or repulsion, and to accelerate and decelerate them by linear induction motor, or L.I.M. In one such development, vehicles or trains are operated in a highly vacuumized tube or tunnel, evacuated, for example, to an altitude equivalent of 300,000 ft. or more. At high speeds, for example between 500 and 2000 m.p.h., little resistance is offered to the transit of the vehicle by the slight amount of air remaining in the tube, and while adequate decelerating force normally is provided by control or reversal of the L.I.M., such force is not available in the event of loss of electrical power to the track and vehicle. So far as is known, no present mechanism is available for automatically supporting and braking a train of this type in the event of power failure.

PURPOSE OF THE INVENTION

A primary objective of the present invention is to provide emergency support and decelerating means for a high speed, magnetically supported vehicle upon loss of electrical power to the magnetic vehicle support means. A further objective of the invention is to mount one or more support shoes on each side of such vehicle, the shoes overlying a pair of support rails extending one along each side of the vehicle. The shoes are raised slightly clear of the rails during such time as the vehicle is supported by its magnetic support mechanism, but gravitate downwardly into supported engagement with the rails upon loss of electrical power to the magnetic support mechanism.

BRIEF DESCRIPTION OF THE DRAWINGS

The foregoing objectives and advantages of the invention will be apparent from the following description and the accompanying drawings, wherein.

DETAILED DESCRIPTION OF THE DRAWINGS

Figure 2:
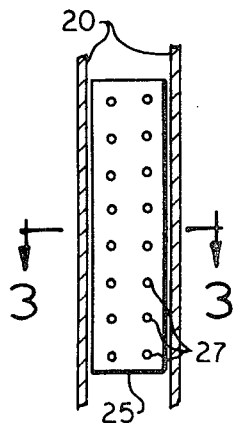
FIG. 2 is a fragmentary, sectional view taken along line 2—2 of FIG. 1, and shows the perforated sole of the skid shoe.

Referring to the drawings in detail, the invention is illustrated as embodied in a high speed passenger vehicle A, magnetically supported, and normally accelerated and decelerated by means including an overhead magnetized rail structure 10 mounted in a vacuumized tube or tunnel B. A pair of magnetized guide rails 11 and 12 are provided, one on each side of the path of the vehicle. During operation the vehicle A is supported magnetically with respect to the rail 10, is centered magnetically in spaced relation between the guide rails 11 and 12, and is accelerated and decelerated by a linear induction motor or L.I.M., not shown. Since the magnetic support and guide means are not features of the present invention, the details thereof are omitted.

The tube B may be either above or below ground, or submerged in the ocean or other body of water. The illustrated tube B is of reinforced concrete with a gas tight metal lining 13. As illustrated, the tube B has provisions for operating two vehicles, or trains, one going each way. The solid lines in FIG. 1 show the vehicle A in transverse section, while the broken line A' indicates a portion of the outline of a similar vehicle going in the opposite direction.

A first row of support brackets 14 are mounted at a selected, uniform height on the interior of the tube B, and a second row of brackets 17 are supported on the upper ends of a row of upright posts 18 secured to the bottom center line of the tube A and braced by plates 19. A friction support or skid rail 20 is mounted on the wall brackets 14, and a similar skid rail 21 is mounted on the post mounted brackets 17. The skid rails 20 and 21, and a similar pair of rails on the other side of the tube B, not shown, for vehicles going the opposite way, are of adequate strength and rigidity to support the vehicles for which they are intended, and are intended to be designed and engineered in accordance with well known principles for each installation for which they are required.

Figure 1:
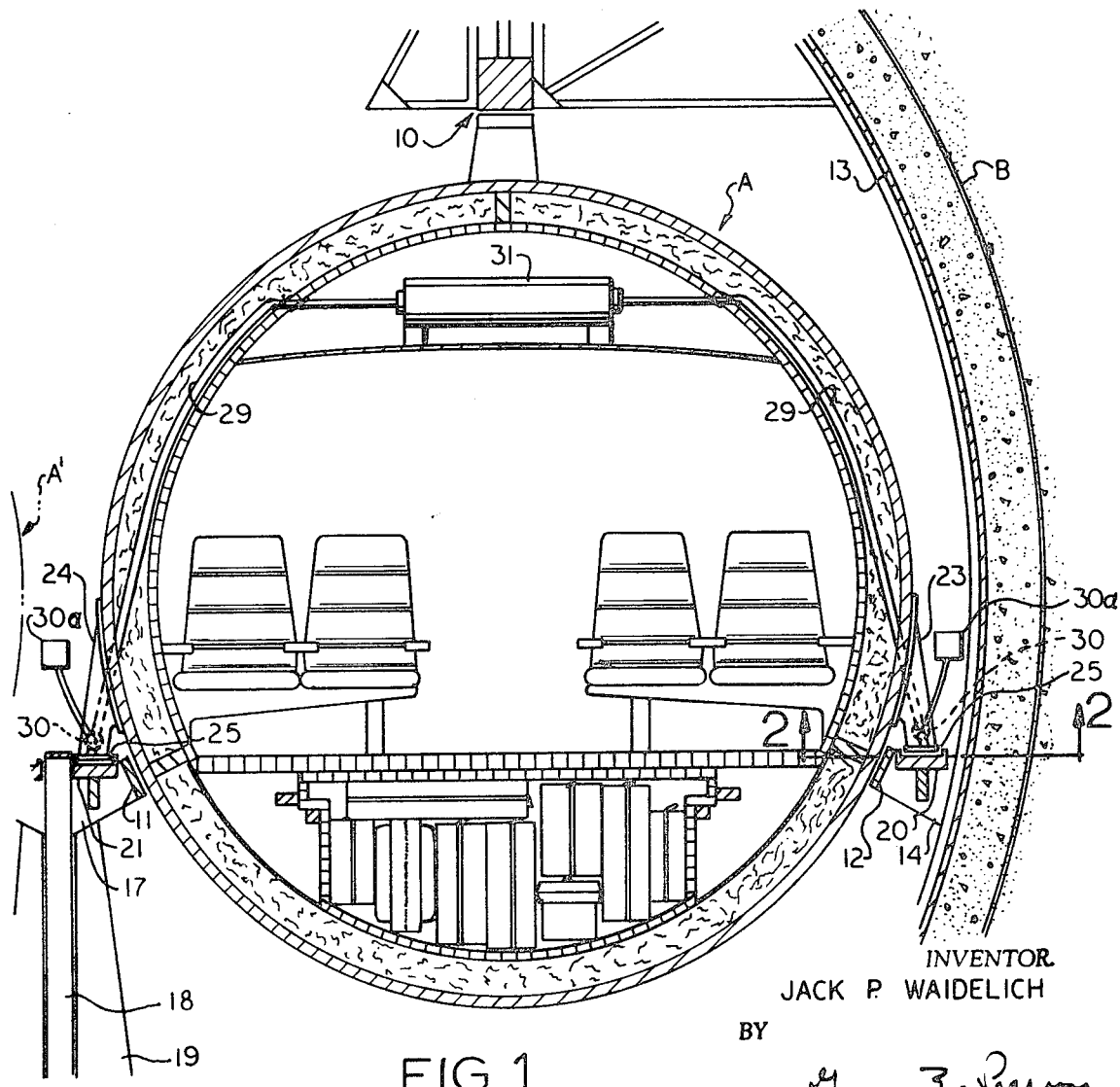
FIG. 1 is a fragmentary, somewhat diagrammatic, transverse, sectional view through a vehicle and a portion of vacuumized tube embodying the invention.

One or more vehicle mounted brackets, such as the brackets 23 and 24 of FIG. 1, are mounted one on each side of each vehicle A, and each of the brackets 23 and 24 has a shoe 25 mounted on its lower end. The combined length of each vehicle support bracket, plus the thickness of its shoe, is such as to provide a slight vertical clearance between each shoe 25 and its respective skid rail when the vehicle A upon which the vehicle support bracket and shoe are mounted is magnetically supported as shown in FIG. 1. This clearance may be, for example, of the order of ¾ inch in a vehicle having an external diameter of the order of 15 feet. The clearance between the shoes and their respective skid rails is not critical, however, and is subject to design and engineering calculations and selection for each installation to be built embodying the invention.

The skid rails 20 and 21 shown in FIG. 1 are of channel cross sectional shape, and the shoes 25 are designed to have a sliding fit therein. Each shoe 25 has a plurality of discharge orifices 27 in the sole thereof, and these orifices are connected by suitable passages 28 to a conduit 29 leading through a valve 30 to a supply, such as a tank 31, of suitable pressurized, vaporizable liquid, such as water. Automatic valve control mechanism, represented by a box 30a in FIG. 1, controls operation of each valve 30 to open it immediately upon loss of electrical power to the magnetic suspension mechanism, to thereafter vary the flow of liquid to the orifices 27 upon predetermined variations in temperature and relative speed, and to shut off the flow when the vehicle comes to rest. The valve control mechanism 30a may be of the type used in automatic sprinklers used for fire control, and which are responsive to selected temperature increase, however, various types of off-the-shelf temperature responsive valves, or position responsive valves, are well known and can be readily designed, and since the specific type of valve actuating mechanism is not a feature of the invention, the details thereof are omitted. All lines from the tank 31 to each shoes 25 preferably are bled of air prior to placing the vehicle A in commission, so that pressurized liquid will be immediately available at each shoe when required.

Figure 3:
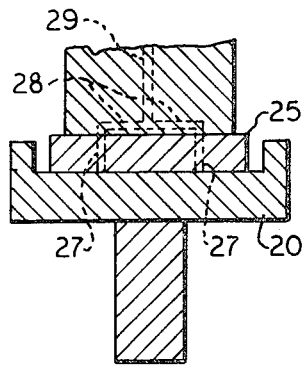
FIG. 3 is an enlarged, sectional view taken along line 3—3 of FIG. 2.
Figure 4:
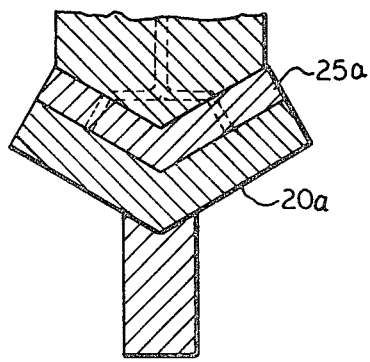
FIG. 4 is a sectional view taken similarly to FIG. 3, but showing a modified form of support rail and friction shoe.

An alternate form of friction rail and shoe structure is shown in FIG. 3, wherein a V-shape rail 20a is provided, and the shoe 25a is shaped to fit in conforming relation therein. This alternate form of rail and shoe otherwise is similar to that of FIG. 1.

OPERATION

During normal operation of the form of the invention shown in FIGS. 1, 2 and 3, the vehicle A is magnetically supported, in uniform, spaced relation, from the overhead magnetized rail 10, and a L.I.M. mechanism, not shown, accelerates and decelerates the vehicle A as required. The magnetic guide rails 11 and 12 retain the vehicle A centered in spaced relation therebetween during the time the vehicle A is so suspended, and assist in guiding it around curves.

Should the electrical current for suspending, guiding, accelerating and decelerating the vehicle A fail, or be shut off, gravity immediately lowers the vehicle so that its shoes 25 slide along the rails 20 and 22, and support the vehicle. Obviously, if the vehicle is traveling at its designed high rate of speed when such power loss occurs, liquid must be ejected through the shoe orifices at once to prevent heat generated by friction from burning off the shoes and thus losing their support. For that reason the automatic control mechanism 30a which controls operation of each valve 30 is adjusted to discharge liquid from the tank 31 through the sole orifices 27 immediately upon loss of magnetic support of the vehicle.

The present invention is not intended to act as the sole braking means for the vehicle, and supplemental braking means, not shown, is provided which is not pertinent to the present invention. The present invention primarily provides emergency support for the vehicle upon loss of electric power, and limited deceleration.

The rate of discharge of liquid from the tank 31 through each valve 30 to the orifices 27 preferably is so controlled by the control mechanism 30a that when the temperature of the shoe 25 is high enough to flash-vaporize into steam the water on other liquid ejected from the orifices 27, the rate of flow through the valve 30 is lowered by such control mechanism, in which case the water vapor or steam thus ejected from the orifices 27 acts similarly to an air bearing to support the vehicle A on the rails 20 and 22. When the temperature of the shoes is lowered below such flash point however, the flow rate of liquid through the valve 30 is increased by the control mechanism 30a so that the shoe 25 is then supported in the manner of a liquid lubricated bearing.

As mentioned previously herein, the mechanism is designed to work at extremely low pressures. The liquid would vaporize instantly upon discharge at temperatures normally prevailing in the tube.

Present calculations indicate that it will take approximately seven minutes to slow the vehicle A to a stop from a speed of 2000 m.p.h., so that if the shoes 25 are to provide the required support until the vehicle comes to a stop, the supply of liquid available for this purpose should be sufficient to last the entire time. However, a supply of compressed air, not shown, preferably is provided as a standby measure, and is automatically introduced, either into the tank 31 or through an alternate conduit, not shown, to the shoe orifices 27 upon exhaustion of the supply of liquid from the tank 31.

The invention provides simple support and decelerating mechanism for a high speed, magnetically supported vehicle in the vent of loss of electrical power, which mechanism is relatively inexpensive, has no operating parts other than the valve 30 and its control mechanism 30a, requires little maintenance, and is fully automatic and always ready when required.

Having thus described may invention, what I claim as new and useful and desire to secure by U. S. Letters Patent is:

1. Emergency support and decelerating mechanism for a high speed, magnetically supported vehicle comprising, in combination with electro-magnetic vehicle support means, a pair of skid rails spaced laterally apart, one thereof on each side of the path of such magnetically supported vehicle, at least one vehicle mounted support element secured to each side of the vehicle and directly overlying each of the skid rails, the bottom surface of such vehicle mounted support element being shaped to conform to its respective skid rail and having a plurality of discharge orifices therein, each vehicle mounted support element being spaced by a selected increment above its respective skid rail when the vehicle is magnetically supported, and being lowered by gravity into vehicle supporting, bearing relation with its respective skid rail when the vehicle is not magnetically so supported, and means for discharging vaporizing liquid through such orifices and between the bottom surface of each vehicle mounted support and the skid rail over which it is mounted, and means actuating said liquid discharging means in the event the vehicle loses its magnetic support and the support elements are lowered by gravity onto their respective skid rails, thereby to provide a fluid type bearing for each support element when thus lowered by gravity onto its respective skid rail.

2. Emergency vehicle support and decelerating mechanism as claimed in claim 1 wherein the liquid discharging means comprises a supply of pressurized vaporizable liquid in the vehicle, a control valve mounted adjacent each of the support elements, a conduit from the liquid supply through each valve to the orifices in the support element adjacent thereto, and temperature responsive means operatively controlling each of the valves.

3. Emergency vehicle support and decelerating mechanism as defined in claim 1 wherein each vehicle mounted support element comprises an upper portion secured to the vehicle, and a shoe mounted on the lower end of said upper portion, the bottom surface of the shoe comprising the bottom surface of the vehicle mounted support element.

4. Emergency vehicle support and decelerating mechanism as claimed in claim 3 wherein a plurality of passages are provided in each shoe and communicate the conduit with the orifices in the bottom of the shoe.

5. Emergency vehicle support and decelerating mechanism as claimed in claim 1 wherein each skid rail is trough shaped, and the bottom portion of each vehicle support element when lowered by gravity into supported position thereon is restrained thereby against relative lateral movement.

6. Emergency vehicle support and deceleration mechanism as claimed in claim 1 wherein the electromagnetic vehicle support means is mounted in a vacuumized tube, and the skid rails are mounted on support elements mounted interiorly of the tube.

* * * * *